(12) United States Patent
Beaudoin et al.

(10) Patent No.: US 8,983,012 B2
(45) Date of Patent: Mar. 17, 2015

(54) RECEIVE TIMING MANAGER

(75) Inventors: Denis Roland Beaudoin, Rowlett, TX (US); Ritesh Dhirajlal Sojitra, Plano, TX (US); Gregory Lee Christison, McKinney, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 13/358,183

(22) Filed: Jan. 25, 2012

(65) Prior Publication Data
US 2012/0121051 A1 May 17, 2012

Related U.S. Application Data

(62) Division of application No. 11/098,130, filed on Apr. 4, 2005, now Pat. No. 8,130,889.

(51) Int. Cl.
*H04L 7/00* (2006.01)
*H04L 7/033* (2006.01)

(52) U.S. Cl.
CPC .................................. *H04L 7/0338* (2013.01)
USPC ............ 375/355; 375/360; 375/316; 375/354; 375/359; 327/152; 327/141; 327/153; 327/161

(58) Field of Classification Search
CPC ................................ H04L 7/033; H04L 7/0337
USPC .......... 375/360, 316, 354, 355, 359; 327/152, 327/141, 153, 161
See application file for complete search history.

(56) References Cited

U.S. PATENT DOCUMENTS

| | | | | |
|---|---|---|---|---|
| 4,841,551 | A | * | 6/1989 | Avaneas ........................ 375/371 |
| 5,313,501 | A | | 5/1994 | Thacker |
| 5,642,386 | A | | 6/1997 | Rocco, Jr. |
| 5,668,830 | A | | 9/1997 | Georgiou et al. |
| 5,761,254 | A | * | 6/1998 | Behrin ........................ 375/355 |
| 5,887,040 | A | | 3/1999 | Jung et al. |
| 6,374,361 | B1 | | 4/2002 | Lee et al. |
| 6,496,043 | B1 | | 12/2002 | Moss et al. |
| 6,567,484 | B1 | | 5/2003 | Hirota et al. |
| 6,577,689 | B1 | * | 6/2003 | Smith et al. ................... 375/354 |
| 6,668,335 | B1 | | 12/2003 | Breach et al. |
| 6,874,097 | B1 | | 3/2005 | Aliahmad et al. |
| 7,031,420 | B1 | | 4/2006 | Jenkins et al. |
| 7,034,597 | B1 | | 4/2006 | Mo et al. |
| 7,198,197 | B2 | * | 4/2007 | Best .............................. 235/492 |
| 7,287,105 | B1 | * | 10/2007 | Owen et al. ..................... 710/52 |
| 7,474,721 | B2 | * | 1/2009 | Fredriksson .................. 375/355 |
| 2003/0095619 | A1 | | 5/2003 | Vallet et al. |
| 2004/0108948 | A1 | | 6/2004 | Stevens et al. |
| 2005/0013354 | A1 | | 1/2005 | Fredriksson |
| 2005/0135518 | A1 | * | 6/2005 | Vallet et al. ................... 375/348 |
| 2005/0243903 | A1 | | 11/2005 | Agazzi |
| 2006/0109942 | A1 | | 5/2006 | Vallet |
| 2006/0174152 | A1 | | 8/2006 | Millman |
| 2006/0273836 | A1 | | 12/2006 | Lin |

* cited by examiner

*Primary Examiner* — Siu Lee
(74) *Attorney, Agent, or Firm* — William B. Kempler; Frederick J. Telecky, Jr.

(57) ABSTRACT

A novel receive timing manager is presented. The preferred embodiment of the present invention comprises an edge detection logic to detect the data transition points, a plurality of data flip-flops for storing data at different sample points, and a multiplexer to select the ideal sample point based on the transition points found. A sample window is made with multiple samples. The sample window size can be designed smaller or greater than the system clock period based on the data transfer speed and accuracy requirement.

16 Claims, 5 Drawing Sheets

RECEIVE TIMING MANAGER

CROSS-REFERENCE TO RELATED APPLICATIONS

This application is a divisional of U.S. patent application Ser. No. 11/098,130, filed Apr. 4, 2005, which is incorporated herein by reference in its entirety.

TECHNICAL FIELD

This invention relates generally to digital circuits, and more specifically to the timing of receiving data.

BACKGROUND

A phase-locked loop (PLL) is a closed loop frequency control system. Its function is based on the phase sensitive detection of a phase difference between the input and output signals of a voltage controlled oscillator (VCO). They can be configured as frequency multipliers, demodulators, tracking generators or clock recovery circuits. PLLs are widely used in modern circuit design, especially in communication system design.

When data comes in, the data is reflected as logic highs or logic lows. The data receiving logic detects the logic highs or logic lows and therefore decides what the data is. When the data changes from a logic high or logic low, a data transition occurs. The data receiving logic, however, cannot detect data right at the time the transition occurs since the data is not yet stable and errors can occur even if the data is detected not at but very close to the data transition point.

Conventionally, the data is captured in flip-flops and used at the rising edge of the system clock. FIG. 1 illustrates a schema of the received data 4 with respect to the system clock 2. Line 2 illustrates the system clock. Graph 4 illustrates the data transition on the node, where points 6, 8 and 10 are data transition points. Setup time $T_{SU}$ and hold time $T_H$ describe the timing requirements on the flip-flop with respect to the clock 2. Setup time $T_{SU}$ is the time that the data must be valid before the flip-flop samples at the system clock time 7. Hold time $T_H$ is the time that data must be maintained valid after the flip-flop samples at the system clock time 7. Setup time $T_{SU}$ and hold time $T_H$ define a window of time that the data must be valid and stable in order to assure valid data sampling. If the setup time $T_{SU}$ is too close to the system clock time 7, there is no adequate setup time. If the hold time $T_H$ is too close to the system clock 7, there is no adequate hold time. The relative position of the data transition points 6, 8, and 10 with respect to the system clock time 7, is determined by the round trip latency time of the system. Also, there are variations caused by process, temperature and voltage so that the data transition points 6, 8 and 10 shift to the left or right.

If a PLL is not used, such a method should accommodate the maximum possible variation to guarantee the setup and hold time so that the circuit does not fail. A significant limitation of a non-PLL based design is that its speed is limited by the round trip latency time of the system. Since a non-PLL based design captures data from outside, using an internal or reflected clock, typically, the highest frequency of such a system not using a PLL cannot exceed 1/(latency_time), where the latency_time is the round trip latency time. For example, a system with 10 ns round trip latency time has a maximum speed of 100 MHz, and a system with 12.5 ns latency time can not be run over 80 MHz. If the IO delay is large, or the remote system is an old and slow system, the round trip latency time will be big so that the system speed will be significantly limited. The overall system speed is limited by the total latency time regardless of the speed of each component in the system. If a system has two devices, both can work at 200 MHz, but the latency time on board is 10 ns, the highest frequency of the system is 100 MHz.

Another method is the use of a PLL based design. This method solves the round trip latency issues, but incurs other costs. 1) The PLL itself is an analog circuit that must be customized for the process to operate reliably across the process variability. 2) If the PLL is used to extract the clock from the data, an encoding of the data must guarantee a minimum transition density to ensure that the sample point does not drift prior to the next changing sample. 3) Another disadvantage of a PLL is that a FIFO (First in First out buffer) is needed. Therefore the system becomes more complicated. If a system A is used to handle the data captured by a PLL and the clock coming out of the PLL that is used for capturing the data is unknown respect to system A's clock, there is no phase relationship between system A's clock and PLL's clock. A FIFO is then required between the PLL's clock domain and system A's domain to bring the data back. The data has to be stored in FIFO with respect to its own clock, and the data may need to stay in the FIFO for 3 or 4 data clocks or even more. Only after the data stored in FIFO gets synchronized across to system A's clock domain can it be emptied. The round trip latency time determines how many cells in the FIFO are required to guarantee that the data is not lost because of variations. The extra FIFO not only increases the cost, it also increases the design complexity.

The system latency time is affected by variations so that it is not a fixed value. There are three variations, namely process (the process of fabricating the semiconductor circuit) variation, temperature variation and voltage variation. Among the three, the variation caused by the process is typically the greatest. However, the process variation is a fixed value after a circuit has been built. The voltage and temperature variations are not fixed. They may change depending on the local conditions. Normally, they change relatively slowly over time.

With the above-discussed limitations of the PLL and non-PLL based designs, the system's data receiving speed is greatly limited. Therefore, an alternative technology that overcomes these limitations is needed.

SUMMARY OF THE INVENTION

A novel receive timing manager is presented. The preferred embodiment of the present invention allows a design to self calibrate the receive timing window across voltage and temperature, it comprises an edge detection logic to detect the data transition points, a plurality of data flip-flops for storing data at different sample points, and a multiplexer to select the ideal sample point based on the transition points found.

In one aspect of the present invention, data-receiving speed is improved by using a small sample window. A sample window is made smaller than the system clock period. Multiple samples are taken. Data transition points are found by using an edge detector. An optimal sample point is selected away from the transition points. The transition points may be found inside the sample window, the optimal sample point will be a point away from the transition point. The temperature variation and voltage variation may cause the transition point to move, and the optimal sample will be moved also to stay away from the transition point. If the transition point is outside the sample window, a default optimal sample point is pre-selected in the sample window. The pre-selected optimal sample point is used until the transition point moves into the sample window, at which time the optimal sample point moves also. The small sample widow is suitable for low speed data transfer such as single data rate (SDR) with lower accuracy requirement.

In another aspect of the present invention, data-receiving speed is improved by using a big sample window. A sample window is made greater than the system clock period, preferably greater than one and half the system clock period. Rising edges and falling edges of the system clock are found. Transition points are found and the optimal sample points are selected at certain points related to the interval between the rising/falling and falling/rising edges. The samples may be across the clock boundary so that the data dragging technique is used to return the sampled data back to the system clock. The sample is re-sampled at a point of the next clock cycle before it is re-sampled at a system clock, where the re-sample point is smaller than the sample point of the original sample. In one preferred embodiment, the re-sample point is half the sample point of the original sample. Dragging samples creates a window larger than the clock period so that the variation can be greater than a clock period just less than two clocks. The bigger sample window is primarily used for higher speed data transfer, such as double data rate (DDR).

The preferred embodiment of the present invention eliminated the greatest variation, the process variation among the three common variations. Also by re-sampling the data, the setup and hold time can be guaranteed. Therefore, higher speed data transfer can be achieved with the existing devices.

BRIEF DESCRIPTION OF THE DRAWINGS

Further aspects of the invention will appear from the appending claims and from the following detailed description given with reference to the appending drawings.

DETAILED DESCRIPTION OF EXAMPLE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The preferred embodiments of a receive timing manager are discussed. Receive timing manager (RTM) is a serial receive logic circuit used, for example, to assist in meeting receive data setup and hold timing. In this case, an RTM is a digitally developed apparatus to emulate a PLL. The RTM can sample multiple samples, and use a methodology to decide the optimal sampling time. An RTM responds quickly to the time variations. It can also drag the data back to the main clock so that the setup and hold time requirement can be met. It makes use of a fact that the data received is in sync with the system clock, although not in phase. In other words, the data coming in will be in series one after another, and each data is a certain time interval away from the previous data, plus or minus temperature and voltage variations.

Received data needs to be sampled at an optimal sampling time. The optimal sampling time is a time that is far enough from the transition points. In order to find the optimal time of sampling, a sample window is created. The sample window is a time period in which multiple samples are taken. Each of the samples is delayed a certain time from the previous one. The samples are taken starting from what might be the ideal clock, which is the main clock. It is also called delay 0. Among the multiple samples of data, one of the samples that is far away from the transition points is selected as the optimal data and will be used. The other samples are discarded. Throughout the description the name "tap" is alternatively used for samples, and the name "tap size" is alternatively used for the delay between a sample point and the next sample point.

An edge detector is used to find the data transition point. An algorithm is used by RTM to decide the optimal sampling point based on where the detected transitions are. The rising and falling edges can be found by doing an exclusive OR to a sample of data at one delay and the sample data at the next delay. If the exclusive OR gives a 1, then a transition of data is found. If data was a 1, and is a 0, a falling edge is found. If the data was a 0, and is a 1, a rising edge is found. Therefore a view of the line is created. For example, if the data is 001111, it is known that the data transition is at sample 3. It is also known that data does not transition at sample position 1, 2, 4, 5 and 6. The ideal sample point is between the transitions.

Figure 1:
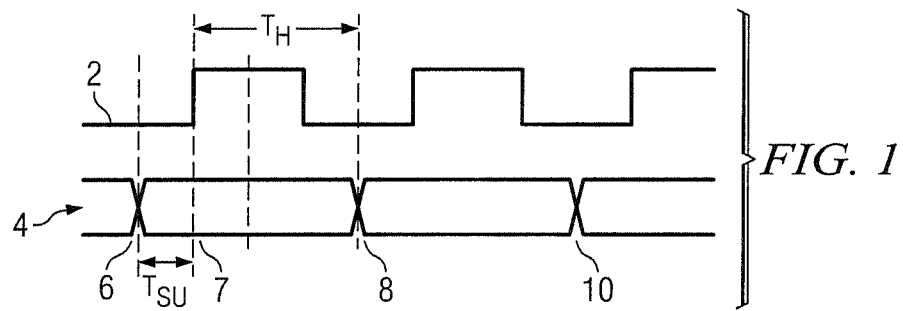
FIG. 1 illustrates a schema of received data with respect to the system clock.
Figure 2:
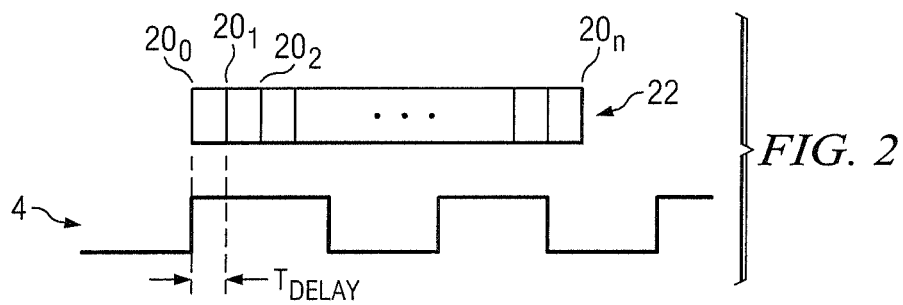
FIG. 2 illustrates a sample window.

FIG. 2 illustrates a sample window 22. The sample window 22 is divided into n time slices. The starting point of the sample window is sample 0. Samples (or taps) 1 through n are taken one by one. Each of the sample points are delayed a certain time $T_{delay}$, or tap size. Preferably (although not required) the delays are uniform, and the sample window size is the number of the taps times the tap size. Although the sample window can start at any point with respect to the system clock, in the preferred embodiment, the sample window is implemented with respect to the system clock (the starting point of a system clock period), and the sample 0 is at the system clock. The transition points are also referred to based on which sample points of the sample window they are corresponding to. For example, a transition at sample point 3 means that the transition occurs at the time corresponding the time of sample point 3 in the sample window.

A sample window can be designed bigger than the clock period so that multiple edges can be found in the sample window. The bigger sample window is preferred for high-speed data, such as double data rate (DDR). The sample window can also be smaller than a clock period, which is preferably used for slower speed, typically single data rate (SDR). Both cases will be discussed in detail.

There are various algorithms for determining the optimal sample points. Some algorithms are simple. Basically, the transition points are found, and the optimal sample point is the transition point plus or minus certain delays so that the optimal sample points stay away from the transition points. The distance between the transition and the sample point need only be large enough to ensure setup or hold of the latching device plus the maximum change that could occur due to temperature or voltage. (Note: for a conventional system, the process variation would also have to be a large consideration). This simple algorithm can be used for low speed data transfer such as single data rate (SDR). Other algorithms are more complex and preferably used for high-speed data transfer such as double data rate (DDR). For these algorithms, both the rising and falling edge of the system clock will be found. The algorithm also determines whether the sample window contains half the clock or not. If both edges are found, the optimal sample points will be transition points plus or minus a certain time that is somewhere less than half of the rising and falling interval.

There are three parameters determining which algorithm to use, namely, the number of samples, the delay between samples and the operating frequency at which accuracy is still demanded. For a 100 MHz system clock, the requirement is loose, and a simple algorithm can be used. Lower frequency, less sample, and lower accuracy is related to less logic hence lower cost. When the frequency moves higher, more samples and more logic are needed. Therefore, higher costs are involved. For 138 MHz or above, accuracy starts to get tight and more complicated algorithms are to be used. The higher the frequency is, the more accuracy is needed, and the smaller the tap size used, so that more sample points in the sample window are used and more complex the algorithm is. Since the window size equals the number of taps times tap size, the sample window size is smaller when frequency increases since the tap size is designed smaller when the frequency increases. Therefore, to have a bigger window, more taps are needed.

The simplest algorithm is that the sample window is less than a clock period so that there is only one possible transition in a sample window. This algorithm is preferably used for SDR and the variation is less than one half the sample window size.

Figure 3:
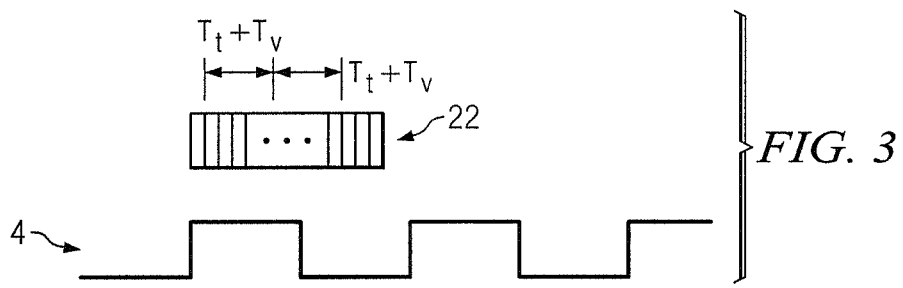
FIG. 3 illustrates a small sample window with respect to the system clock period.

FIG. 3 illustrates a small sample window 22, with respect to the system clock period. Line 4 is a system clock. For SDR, only one data transition can possibly occur during one clock period. The sample window does not have to be big enough to keep the transition point inside the window. As has been discussed, the process variation $T_p$ is fixed after a circuit is made. As a result, most of the variations are the temperature variation $T_t$ and voltage variation $T_v$. The temperature and voltage variations cause the transition point to shift left or right a maximum value of $T_t+T_v$. Therefore, the variations caused by temperature and voltage times 2, or $2(T_t+T_v)$ is the minimum window size. Since the temperature and voltage variations are smaller than process variation, the sample window can be designed small without sacrificing accuracy.

In the preferred embodiment, the small window algorithm can be described as keeping the sampling point n samples away from the transition point, which is found out by an edge detector. If the transition point moves, the sampling point moves also and stays n samples away from the transition point. The sample taken at the optimal sample point will be kept. Other samples are discarded. With a window size smaller than the system clock period, there is no guarantee that the transition will occur outside the window or inside the window. If the transition point happens to be inside the sample window, since the exact transition point is known, the optimal sampling point can be selected away from the transition point and far enough so that the setup and hold time requirement is met. If the transition point is outside of the sample window, the optimal sample point can be a pre-selected sample point, preferably the center point of the sample window.

At the beginning, when no transition has been found by the RTM, the RTM uses a pre-selected sample point as the optimal sample point. The pre-selection is based on what is thought to be the ideal point. This is a guess point and it will be adjusted as soon as the first transition point is seen. Since the pre-selection will not be right at a transition point if no transition is found, no sampling will be made. If the transition point is found outside of the sample window, the pre-selected sample point is kept. Because the sample is outside, as long as the window is big enough to meet setup and hold time with margins, the setup and hold time requirement can be met. Typically, the setup time and hold time for a flip-flop is about 100 ps, so that for an SDR system, it is not difficult to meet the setup and hold time. For example, in one embodiment, the delay between each sample is designed to be 250 ps. Therefore, even the optimal sample point is one sample away from the transition point, the setup and hold time is still met with adequate margin.

The transition point can move inside the window due to variations. As it does, the sampling point moves away from the transition until it hits the boundary of the sample window. There is no problem even the optimal sample point moves to the rising edge of the system clock. However, the transition point should not move more than half the sample window size, otherwise, the sampling window is too small.

In the preferred embodiment, the pre-selected sample point is desired to be at the center of the sample window. In other embodiments, it can be off the center, such as 40 percent of the sample window. Whether to sample earlier or later than the central point depends on how the samples vary. For example, if the falling edge variation is larger than the rising edge variation, then the pre-selected sample point is preferably further away from the falling edge.

The sampling window is determined at chip design time. It is determined by the variations caused by temperature and voltage. The sample window maybe different for a fast process and a slow process. A fast process has shorter delay times, and corresponds to a smaller window. However, the design should fit both a fast process and a slow process. Since the variations caused by temperature and voltage do not change fast, in order to speed up the processing, a pre-recorded sample point can be still be used as the current optimal sample point, and the new optimal sample point can be used for next data. For example, previously the sampling point is 3, and it moves to sample point 2 in this transaction due to variation, sample point 3 can still be used for current data selection. On the next clock cycle, sample point 2 can be selected. In another embodiment one could allow the pre-selected sample point to be programmable.

Figure 4:
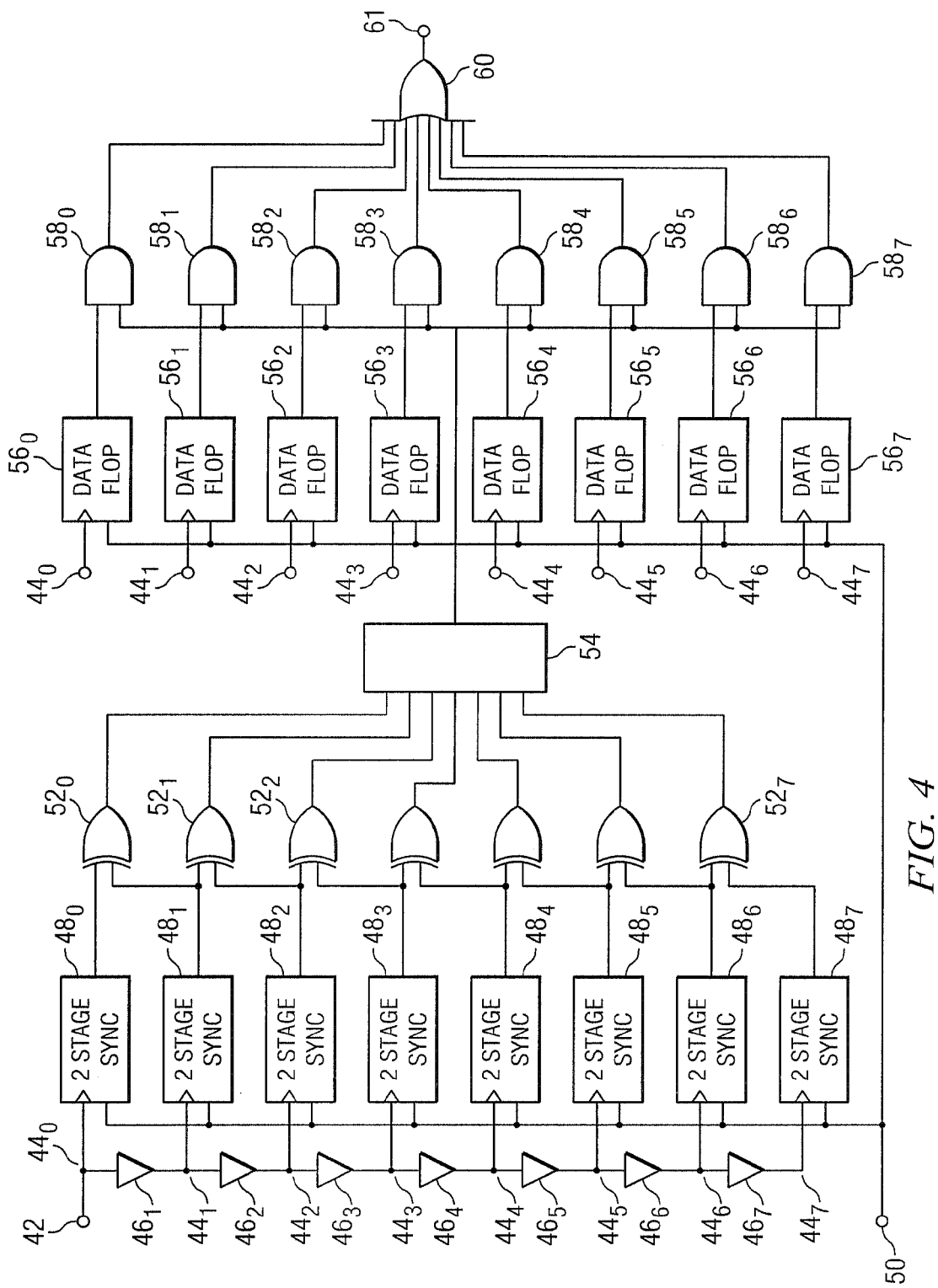
FIG. 4 illustrates a schematic circuit diagram of a preferred embodiment having a small sample window.

FIG. 4 illustrates a schematic circuit diagram of a preferred embodiment having a small sample window. This embodiment illustrates part of an RTM that contains a delay window logic, an edge detection logic, data flip-flops and a data selection logic. There are seven delay buffers $46_1$ through $46_7$ corresponding to eight delayed clocks at nodes $44_0$ through $44_7$. Delayed clocks at nodes $44_0$ through $44_7$ are derived from the system clock at node 42. It is to be noted that the design of eight clocks is only an example. The number of delays required depends on the accuracy requirement. The primary function of the delay buffers $46_1$ through $46_7$ is to achieve a minimum delay (tap size) of $T_{delay}$ between each clock. This will create a minimum RTM sample window size of $7*T_{delay}$. At each delayed clock from clock at node $44_1$ to clock at node $44_7$, one data sample is taken from the data node at node 50. The optimal sample is selected from the seven samples. The selection is based on where the transition point is.

An edge detector for the received data bit 0 to detect the transition point is included in this embodiment. The edge detector comprises delay buffers 46, synchronizers 48 and XORs 52. Even though the circuit may have multiple bits, only one bit, preferably bit 0 is analyzed by the edge detector, as other bits will transit at the same time the bit 0 transits. Therefore, even if there are multiple bits, only one detector is needed. It is required that the skew between the data nodes is less than $T_{delay}$ at maximum timing (slow process). The edge detection is implemented using eight data synchronizers $48_0$ through $48_7$ with XOR logics $52_0$ through $52_7$. The XOR logics takes input from the bit 0 at node 50 at different sample points, and compare each sample to its neighboring sample to find out the data transition. A "1" will be output if a transition is found.

If the data transition is within the RTM sample window, the RTM will move the clock sample point in increments of one, away from the transition point. The RTM will stop when the sample point is greater than four clock delays away from the transition point, or the sample point reaches the upper or lower boundary (seven or zero). The selected clock sample point will be used for selecting the optimal sample among seven samples. Since the voltage and temperature variations are less than half the sample window, the worst case sample change is approximately one half the number of taps.

If the data transition does not occur within the RTM clock window, then a default clock sample point is used, preferably sample point 4 (or the middle point if more than 8 points are used). In the event that the data transition point begins outside the RTM clock window but moves within the window due to the variations of the temperature and voltage, the RTM will adjust the optimal clock sample point using the same method as described above.

There are eight flip-flops $56_0$ through $56_7$ for each bit. The inputs of these flip-flops are driven directly by the receive data nodes, or in other words, these flip-flops take the samples directly from the data nodes. Eight flip-flops recorded eight samples, each at one sample point. In order to select which sample point to use, eight samples for bit 0 are multiplexed in a multiplexer 58, 60. A select logic 54 determines the optimal sample point, and drives the multiplexer 60 to select the corresponding sample. The selected data is sent to node 61 for use. Other data that is not selected is discarded. The selected data is put on the main clock and used at the rising edge of the next clock. This is equivalent to dragging the data to the next system clock cycle. By doing this, the setup and hold time is met, primarily because this algorithm is used for lower speed, so that each delay is big enough for the setup and hold time. For example, if the optimal sample point is at the middle of the sample window, the setup time is at least $3*T_{delay}$, and the hold time is at least $3*T_{delay}$. In one embodiment with $T_{delay}$ of 250 ps, each of the setup time and hold time is 750 ps, much greater than 100 ps required by a flip-flop.

The data flip-flops 56 shown in FIG. 4 are only for one bit of data. Multiple bits can be sampled using several methods. If the variation between bits can be controlled, the window size can be extended to (2*(Total Temperature variation+ Total voltage variation))+the worst-case bit-to-bit delay. Another method can replicate the same data logic for each received bit (not shown). For those bits, the same optimal sample point as bit 0 is selected. For each bit of data, eight flip-flops and one multiplexer are needed.

The previously discussed sample window and sample selection algorithm works for low speed such as SDR and solutions where the receive data transition point does not traverse a clock cycle due to temperature and voltage changes. This type of a solution is not suitable for double data rate (DDR) or designs with variation greater than the clock period. For DDR, there are two data received in one clock period so that higher accuracy is required. The size of the sample window and number of samples determine how accurate the system is. Since DDR needs more accuracy than SDR, the sample window should be larger. It is preferred that the sample window is big enough to hold at least one clock period so that both edges of the clock period can be seen. In actuality to see both edges of data, the sample window would be slightly larger than one and a half clocks.

If the sample window is big enough and two transitions are seen in the sample window, the right sampling point can be found. However, the algorithm used is the key to determining how fast the circuit can run, how much margin is desired, and how much the process spread can exist in the technology used. Therefore, the simple algorithm that is discussed in previous paragraphs is modified to meet these goals.

Figure 5:
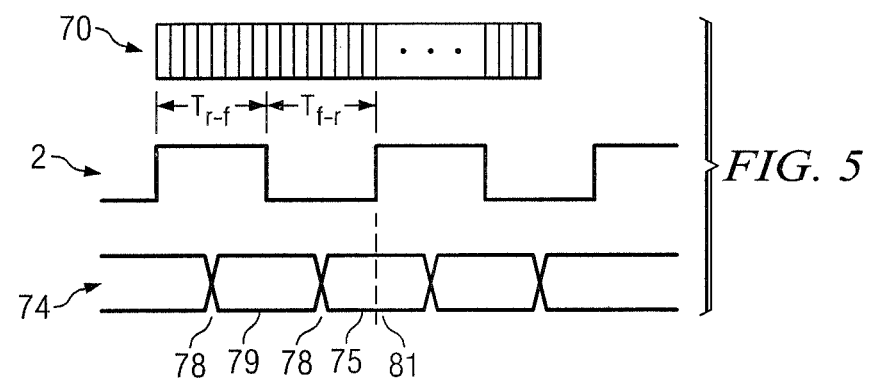
FIG. 5 illustrates a big sample window for double data rate.

FIG. 5 illustrates a sample window 70 for DDR. Line 2 is a system clock. The data 74 transition twice per clock period and the transitions 78 can be anywhere in the clock period. This is why the window has to be big enough to capture the both transitions and also accommodate both rising and falling edges of the system clock. If the accuracy of the data is such that the clock rising and falling difference is also taken into account, the sample window is preferred to be a little over one and half the clock period. The reason is that the falling to rising time $T_{f\_r}$ and the rising to fall timing $T_{r\_f}$ may be different so that both rising and falling edges have to be seen to know the clock period. The algorithm should accommodate this difference. For example, the falling to rising $T_{f\_r}$ is 10 samples but the rising to falling $T_{r\_f}$ is 8 samples, so that half the distance of the rising to falling sample point is 4 and the falling to rising is 5. If the algorithm is to be more accurate, the window will be a little bigger than one and half the clock period. Otherwise, the accuracy drops significantly.

The size of the window should also be big enough to handle variations of temperature and voltage. And should also be big enough to handle sample setup and hold time with adequate margin. Normally, a smaller tap size is used to improve accuracy. As a side effect, with smaller tap size, the number of taps is increased and the circuit is harder to build.

When the sample window is bigger than the clock period, there are multiple rising and falling edges in a sample window. If a transition is at time $T_{tran}$, and half the clock period is $T_{half}$, the ideal sample point 79 is at $T_{tran}+T_{half}/2$ or $T_{tran}-T_{half}/2$. If the time interval between rising edge to falling edge and the time interval between falling edge to rising edge are not the same, the ideal transition points 79 should be adjusted correspondingly. Similar to the case discussed in the previous paragraphs, if the transition point shifts, then the ideal sample points shift correspondingly. So that the sample is always good regardless of the variations due to temperature and voltage etc.

An issue may arise that in certain cases, the setup and hold time requirement cannot be met. Conventionally, the optimal sample data 79 can be used at the next clock 81. However, it is difficult to guarantee that whatever sample data is used will guarantee that the setup and hold time is met. For example, assuming a multiplication operation is to be conducted, which takes a relatively long time, if the data is put up to the next clock directly, the multiply operation has to be much faster. If the optimal sampling point 75 is close to the next clock period 81, the time allowed for multiplying will be very short. Therefore the data should be brought to a reference clock that can guarantee that enough time is provided to do things down stream. The data has to be brought back to a system clock, or reference clock so that long operations such as multiplication can be conducted. Besides, since the frequency is high, the clock period is small, there is the possibility that the variations caused by temperature and voltage, etc. are greater than the system clock period and the sampling goes across the clock boundary so that errors occur. Assuming variations of temperature and voltage is 7 ns, and the clock period is 5 ns, the sample point can vary larger than the clock period. This means samples can go through two clock edges. In conventional systems, when a data is sampled, it is already at the system clock so no setup and hold time is met, even if it means that the round loop delay might cloak it very slow to make sure meeting setup time.

Figure 6:
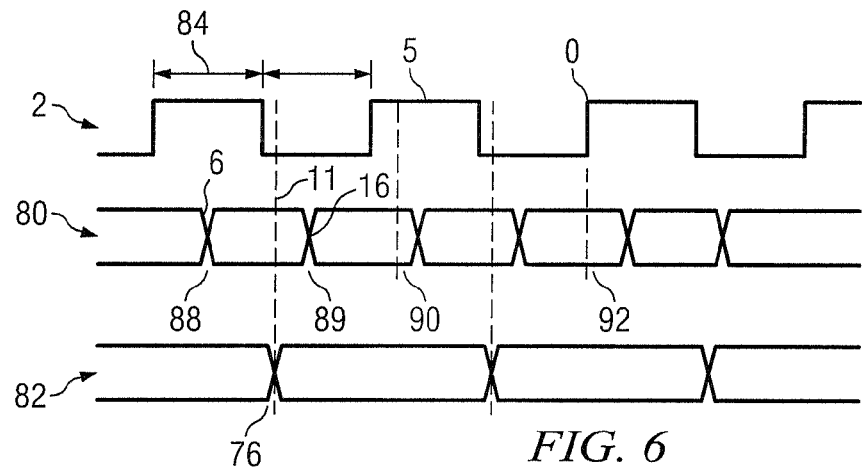
FIG. 6 illustrates the data dragging.

In the preferred embodiment, a method is used to drag the sample to the system clock. The RTM knows the system clock and all operations are in respect with the system clock. Therefore a data can be dragged back to a system clock. Throughout the description, dragging a data sample to the system clock means dragging a piece of data to the beginning of a subsequent system clock cycle. When the data is dragged, the order of the data is still kept, similar to a FIFO, but the availability of the data is more predictable. FIG. 6 illustrates the data dragging method. Signal 2 is the system clock. It is assumed to have a period of 20 samples long. Signal 80 is the received data on a data node. The transitions 88 and 89 occur at around sample point 6 and 16. Therefore, the ideal sampling is taken from the node at 76 (the sample 11 of the sample window), which is the transition point plus half of the half clock period. Signal 82 illustrates the sampled data that is equivalent to having a transition at sample point 11 since the data is captured (therefore changes) at this point. The data sampled at point 76 (sample 11 of the sample window) can be re-sampled at sample point 5 of the next clock, where sample point 5 is half the value of point 11. Sampling at sample 5 of the next clock period, which is shown at time 90 is also described as dragging the data back to sample 5. It is to be noted that sample 5 is in the next clock period. Therefore, time wise, sample 5 is later than sample 11. It appears that the data is brought back to an earlier time (sample 5) but since it is in the next clock period, it is actually forwarded a whole clock. The re-sampled data at sample 5 can be re-sampled again at point 92 (sample 0 of a sample window) of the next clock (also described as dragged back to the system clock) and be used. Sampling the sample data at sample point 5 is similar to delaying the data and making it available at sample 5 of the next clock period. This way, there is plenty of setup and hold time. Using a simple way to describe the previous operations, the previous operations can be described as: dragging the sample at 11 to sample 5, and then dragging to the next system clock.

By sampling at half the sample point, even the variation is twice the period of the clock period. The data can be effectively dragged back to the system clock. The ability of dragging back the data across the clock reference means that the variation can be greater the clock period. This is an important feature for high-speed data transfer. As at higher speed, the clock period gets smaller but the variations caused by voltage and temperature remain substantially fixed regardless of the speed. If the data cannot be dragged back, the method (detect transition point and stay away from it) breaks when the variation is greater than the clock period. The key of dragging data back is that it creates a wider capture variance.

In the preferred embodiment, the data is dragged to half of the sample point, and then dragged to the next clock. In other embodiments, more dragging backs can be performed if the variation is greater than twice the clock period. For example, if the frequency is so high that the variation is greater than twice the clock period but less than three times of the clock period, the data can be dragged back to two-thirds of the sample point of the next clock, dragged again to one third of the sample point of the second clock, and again to the beginning of the third clock. This way, the sample data goes across three clock boundaries. However, much higher variation can be handled.

The data does not always have to be re-sampled at half the sample point before it is sampled at a system clock. In some cases, there is plenty of setup and hold time so that there is no need to re-sample the sampled data at half the sample value. The data can be sampled off the external bus at an optimal sample point, and re-sampled at the next clock and is then ready for use. As long as the data has enough setup and hold time, the data can be dragged (re-sampled) directly to the next system clock by re-sampling the sampled data at the next system clock without sampling at half the sample point.

An algorithm determines when the sample data can be used directly at the next system clock and when it has to be re-sampled at half of the sample point based on how much setup and hold time is provided. For example, if the sample is at sample point 1, there is plenty of setup and hold time, and there is no reason to re-sample at half the sample value, which is sample 0, and then re-sample at the next system clock, which is sample 0 again. Preferably, if the sample point divided by 2 is less than 3, there is no reason to re-sample at half the sample point of the next cycle, as sliding the data right would erode set up time to increase hold time, and setup time may be at risk if the point in which the sample window divided by 2 is too close to the next clock edge. Also, if the sample point is greater than 2 times the samples in a clock period minus 3, the half-sample-point re-sample may also be dropped, as the sample has shifted so far right that it may jump in the next cycle, such as the third cycle. Therefore, it is possible to predict the point at which the data would have traverse a third clock boundary, and the data can be used one cycle earlier, still having a variation of two cycles.

Figure 7:
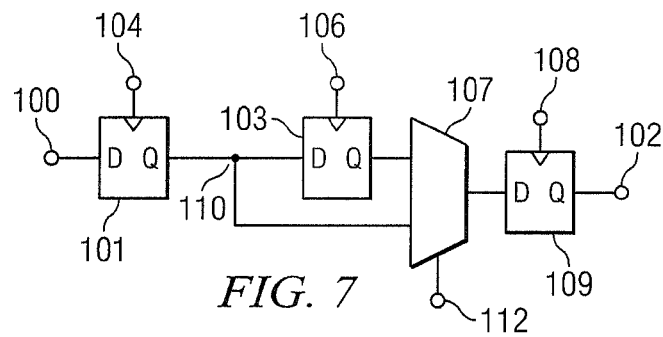
FIG. 7 illustrates a multiplexer logic that is used to multiplex a sampled data and re-sampled data at half the sample point used in data dragging.

FIG. 7 illustrates a multiplexer logic that is used to multiplex the sampled data and re-sampled data at half the sample point. Node 100 is a data node that received data comes in. Flip-flop 101 samples the data from the node 100 and the sample is kept in the flip-flop. Flip-flop 101 is driven by a sample clock at node 104. Flip-flop 103 re-samples the sampled data at half the sample point of the next clock cycle and keeps the data. Flip-flop 103 is driven by a sample clock at node 106, where clock at 106 is half the clock point at node 104. A multiplexer 107 is coupled to the outputs of flip-flops 101 and 103. The multiplexer 107 is controlled by a select line 112 which determines whether the data of flip-flop 101 or the data of flip-flop 103 is selected. If flip-flop 103 is selected, the sample at half the sample point will be taken. If flip-flop 101 is selected, the sample at half the sample point will be dropped and the sampled data from node 100 is taken. Flip-flop 109 samples the output of multiplexer 107 at the next system clock. If dragging across three clock cycles is required, then another flop and clock is added after flop 103. The multiplexer 107 can then select from all three flops, to allow for the widest 3 clock variation.

FIG. 6 and FIG. 7 together helps the understanding of the operation and this embodiment. Flip-flop 101 samples at point 76, which is the sample 11 of the sample window in FIG. 6. Flip-flop 103 samples at point 90, which is the sample 5 of the sample window. Flip-flop 109 samples at point 92, which is right at the clock time of the next system clock.

If re-sampling at half the sample point is not needed, the re-sampling circuit can be skipped based on an insert flag at select line 112. When the insertion flag is not set, the data is not re-sampled at sample point divided by 2 and the data is used earlier (at the next clock). If the insertion flag is set, the data is re-sampled at sample point divided by 2 and the data is used later. By using this logic, the clock cycle can be adjusted. In one transaction, the data can be brought two cycles away from the original reference clock. In next transaction, the data could be brought only one clock cycle away because it is desired that the data is used early as long as setup and hold time is not violated. The decisions are made to each piece of data based on how much setup and hold time is available.

Figure 8:
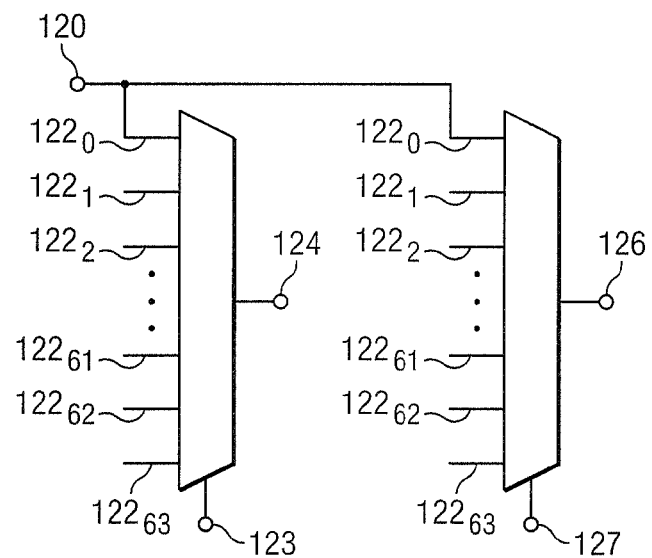
FIG. 8 illustrates a schematic circuit diagram used for generating clocks for dragging data.

FIG. 8 illustrates a clock multiplexer that is used to select a delayed version of the system clock to be used for sampling the data. It generates clocks for the sample point 124 and half the sample point 126. The clock at node 120 is the system clock, 64 delayed clocks $122_0$ through $122_{63}$ are generated from the main clock. The selection at node 123 is set to the tap value, or the ideal sample point, the sample clock is output at node 124 and used by flip-flop 101 in FIG. 7. The selection at node 127 is set to the tap value divided by 2, or the ideal sample point divided by 2. The sample clock divided by 2 is output at node 126 and used by the flip-flop 103 in FIG. 7. Therefore two clocks are generated.

Figure 9:
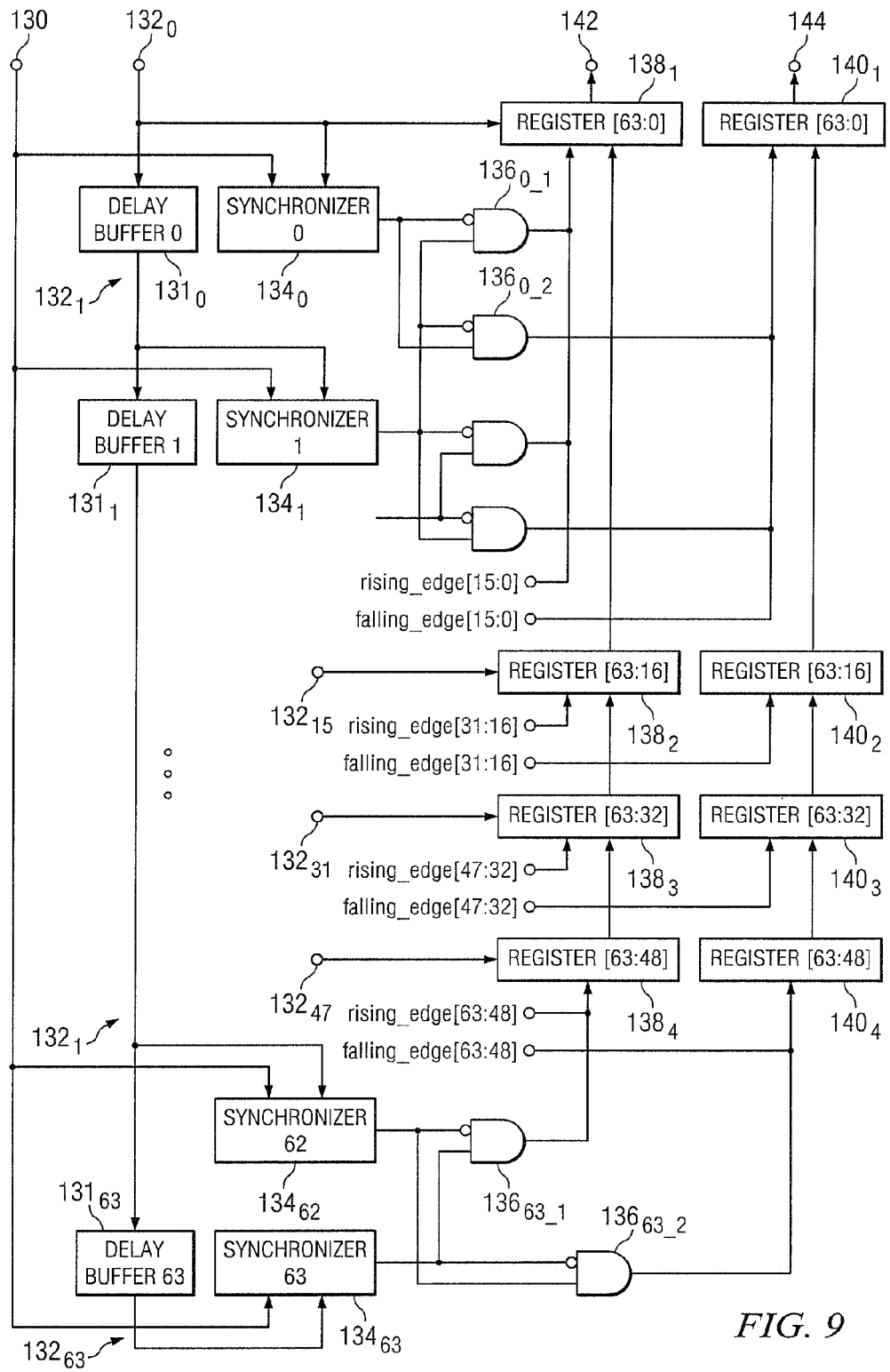
FIG. 9 illustrates a preferred embodiment of a system clock edge detector for DDR or high speed stream.

FIG. 9 illustrates a preferred embodiment of a system clock edge detector for a DDR stream. The clock edge detector detects both the rising and falling edges of the clock. It is made of delay buffers $131_0$ through $131_{63}$, synchronizers $134_0$ through $134_{63}$, NAND gates $136_{0\_1}$ through $136_{63\_1}$ and $136_{0\_2}$ through $136_{63\_2}$, and registers $138_1$ through $138_4$ and $140_1$ through $140_4$, delayed clocks $132_0$ through $132_{63}$ and data node 130.

NAND gates $136_{0\_1}$ through $136_{63\_1}$ find edges by looking for data that was a 0 but is a 1, which is a rising edge. NAND gates $136_{0\_2}$ through $136_{63\_2}$ look for data that was 1 and is a 0, which is a falling edge. All the rising data are "OR"ed and sent to registers $138_1$ through $138_4$. Similarly, all the falling data are "OR"ed and sent to a registers $140_1$ through $140_4$.

Obviously the rising edges and falling edges cannot occur at the same time. The rising edge of the sample and the falling edge of the samples are found and the difference between rising and falling is also found. If rise is at 1 and fall is at 10, then the distance between rise and falling is 9. Each of the registers $138_1$ and $140_1$ has 64 bits that indicates where the transitions are in time. For example, if there is a 1 at 62 in register $138_1$, it means there is a data transition at sample point 61 and 62, and the transition is a rising.

One of the issues is that the edges analyzed may be so far off the system clock as to be in the next cycle. So the edge detect information has to be brought back to the main clock domain. The method of simply recording the rising and falling edges works really well as long as the sample window is less than the system clock. In order to better understand the edge detector in FIG. 9, reference can be made to the one in FIG. 4. The edge detector shown in FIG. 4 does not need a register. Because the sample window is smaller than a clock, there is no concern that the data can not be clocked at the system clock because it will be always be valid on reference clock. The data is sampled and used at the next clock because the setup and hold time can be met and there is no reason to re-sample the clock.

When the sample window increases over the system clock period, an issue appears. In FIG. 9, delay buffers $131_0$ through $131_{63}$ construct a sample window bigger than the system clock so that the delays are beyond the clock boundary. This problem can be solved similar to the dragging back of the sample data discussed previously. It is observed that although the whole window (delay element 0 to delay element 63) is bigger than the clock period, the whole sample window can be divided into sections, and each section, such as delay 0 to 15, delay 16 to delay 31, delay 31 to delay 47, and delay 48 to delay 63, are smaller than the clock period. Therefore, the detection of delay 48 to 63 can be dragged back. Samples 63 down to 48 are all dragged back to 47. Described in another way, the sampled transition is re-sampled at clock 47 at the next clock cycle. It is to be noted that delay elements 32 to delay 47 will also be sampled, and all the data for delay elements 32 and 47 will be re-sampled at clock 31 of the next cycle, together with the re-sampled data for samples 48 to 63. Again, all the combined data will be re-sampled at clock 0 of the next clock cycle, together with the new samples 0 to 15.

The result of the re-sampling three times is that samples 63 through 48 are potentially used a few clock cycles down, anything that is detected in this region won't show up in the logic until three clock cycles. What is detected in the region from delays 32 to delay 47 will not show up in two clock cycles. What is detected in the region from delays 15 to delay 0 will not show up in one clock cycle. The edge detector accumulates the transition density. It is to be understood that if a transition is detected, and re-sampled once, re-sampled a second time, and re-sampled a third time, obviously the detection value is not changed. What is changed is the time the detection is brought back to the system clock and used.

In the detector shown in FIG. 4, it is known that the sample window is less than a clock period, so that all the detections are brought to the next clock and used. While in the current embodiment in FIG. 9, since it is guaranteed that a section of the window is less than a period, the section is brought to the next clock, then this section plus the next section are brought to the next clock again. This procedure is repeated until all the sections are brought to the clock. The detection is then ready for use.

Since the sample window crossed the clock boundary, it has to be guaranteed that the setup and hold time is not violated. This is true as long as the total delay in a section is less than a clock period. In one preferred embodiment, a section contains 16delays, assuming each of the delay is 50 ps. The total size will be 50 ps×16, which is 800 ps. Taking the process into consideration and use a typical process spread of 2.4 (process spread of 2.4 means the fast process will be 2.4 times than a slow process), the total time is 50 ps×16×2.4, or 1.92 ns. The corresponding frequency is then 520 MHz. This is the fastest that can be handled by this detector.

One of the issues is how to determine the accuracy of the system. The accuracy of the system is based on tap size, maximum frequency and where the sample is taken. At higher frequency, the number of taps required goes up because of the accuracy requirements demands that both edges to be seen. When frequency is lower, the window may fall into one clock period without affecting accuracy.

The number of taps used to generate the delayed clocks need to be custom cells. The number and size of the delay elements for a particular design of a RTM depends upon the maximum frequency of operation.

Figure 10:
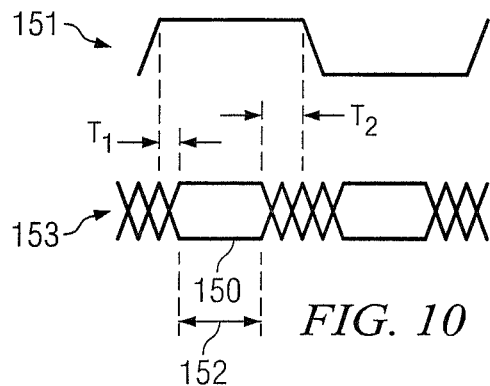
FIG. 10 illustrates the relationship of a incoming read data to a incoming clock.

FIG. 10 illustrates the relationship of the incoming read data 153 to an incoming clock 151. Reference 152 is the data valid window. "$T_1$" is the period from the end of clock rising edge to the starting point of the data valid window, "$T_2$" is the period from the ending point to the starting point of the clock falling edge. Point 150 is the 50% point of the data valid window. To sample the data correctly, the tap selected should be at 50% of the data valid window, which is point 150.

Assuming T is the tap size, P is the process spread and C is the clock period, to achieve the 50% mark in the data valid window, $(T_1+T_2)/(T*P)$ taps are needed. Considering an uncertainty of ±2 tap in detecting the rising edge of the clock, $(T_1+T_2)/(T*P)+2$ taps are needed. Considering the uncertainty of ±2 tap in detecting the rising edge of the clock and the uncertainty of ±2 tap in selecting the 50% mark, $(T_1+T_2)/(T*P)+6$ taps are needed. To cover the whole cycle, the number of taps required will be $(4*T_2)/(T*P)+12$. For a clock duty cycle of 45/55, the uncertainty on the falling edge of the clock is (0.1C−tDQSQ) where tDQSQ is the variation on DDR between the DQS (Incoming reference clock) and the data signals.

Thus, the number of taps required will be $(4*T_2)/(T*P)+12+(0.1C-tDQSQ)/(T*P)$. The maximum frequency supported will be $10^6/(4T2+12TP+0.1C-tDQSQ)$.

In worst case, the maximum frequency supported is calculated using process spread P equals 3.

Figure 11:
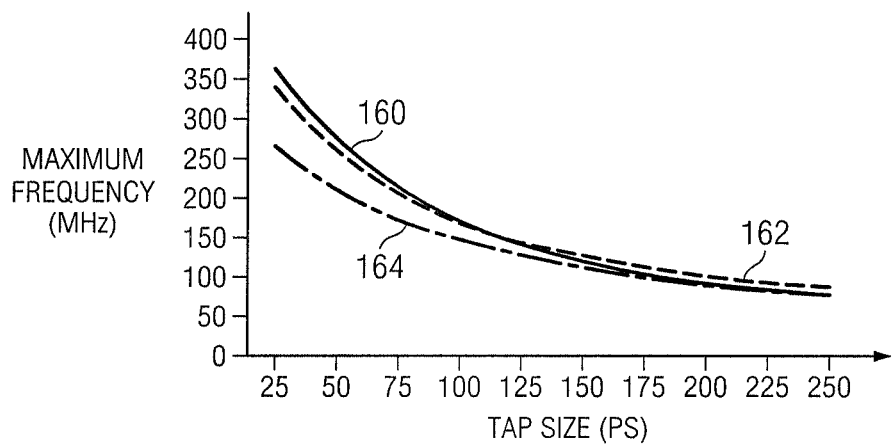
FIG. 11 shows the maximum frequency achieved with various tap sizes.

FIG. 11 shows the maximum frequency achieved with various tap sizes, where lines 160, 162 and 164 illustrate DDR400, DDR333 and DDR266 operated at 200 MHz, 166 MHz and 133 MHz double rate, respectively. It is clear from the figure that to operate at 200 MHz, a maximum tap size of 50 ps is needed. For a worst-case analysis, the number of taps must be calculated using p=1.

Figure 12:
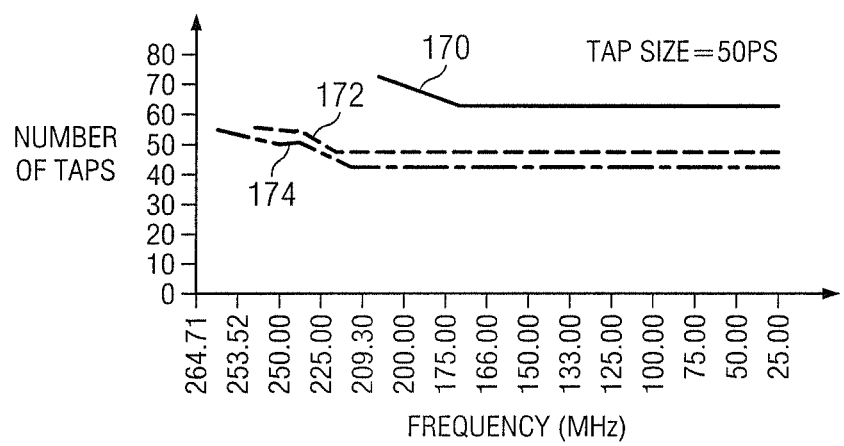
FIG. 12 shows the number of taps needed to support various frequencies for particular tap size.

FIG. 12 shows the frequency of operation with varying number of taps for a 50 ps tap size. Line 170 is DDR266 or 133M at double data rate. Line 172 is DDR333 or 166M at double data rate. Line 174 is DDR400 or 200M at double data rate. It can be seen that to operate at 200 MHz using a DDR400 device, a minimum of 44 taps is needed. To operate at 166 MHz using a DDR333 device, a minimum of 48 taps is needed and to operate at 133 MHz using a DDR266 device, a minimum of 64 taps is needed.

The RTM uses a different methodology than a PLL. What an RTM does is it tracks the change in the data that comes back in, and always use the same clock version without having a PLL and related FIFO/synchronizers. The whole idea is that the data coming in is sliced off the clock.

The preferred embodiment of the present invention has several advantageous features. First, by using this technology, the need of worrying the process variation is greatly eliminated. Because the sample window has a variation that is affected only by temperature and voltage, not the accumulated sum picked up in a round trip. The process variation is a constant for a data stream. Among the process, temperature, and voltage variations, process variation is the greatest, when process variation is removed, the setup and hold time requirements due to process variation is also eliminated, so that the speed can be much faster. With an RTM, although the board etch may be big, since it always has the same delay and the data come in is like a pipe, the data can be latched at ideal time. Simple IO buffers can be used to run much faster. In conventional systems, all the variation has to be accommodated on the remote system since the clock period must be greater than the round trip latency otherwise the system breaks. Unfortunately the remote system might be a really slow system made of old technology. So the whole system becomes really slow.

Second, since the reference clock is known, RTM does not have to sync to the system clock since RTM can always drag the signal sample point to the main clock without synchronizing with it. An RTM does not have to know the clock of a remote system, it syncs to its own system clock.

Third, the setup and hold time for RTM is relieved. Typically, any time data comes in, a minimum setup time before the rising edge of the sample point and hold time after the sample point must be provide. With an RTM, the data can have a one setup time, one hold time, and the speed is decided by the transition point to sampling point.

With the advantageous features mentioned, the speed can go faster without the need to improve the round trip latency time, more data can be transferred with lower technology. Cheaper buffers can be used for up to about 400 Mbits/second data before going higher technology that is more intense. The setup and hold time can be guaranteed because only the voltage and temperature variation needs to be dealt with rather than the variation with process. This is a significant improvement. The preferred embodiment moves the data transferring out of the analog domain and into digital domain. PLL is extremely process dependent, layout extensive, therefore analog. RTM is digital.

Although the invention has been described in detail, it should be understood that various changes, substitutions and alterations can be made thereto without departing from the spirit and scope of the invention as defined by the appended claims.

What is claimed is:

1. A receive timing manager comprising:
   a data node;
   an edge detection logic coupled to the data node;
   a data selection logic coupled to the edge detection logic;
   a plurality of data flip-flops each having an input node, a clock node and an output node; and
   a multiplexer coupled to the data flip-flops and the data selection logic, wherein the edge detection logic comprises:
   a first clock node;
   a second clock node;
   a plurality of delay buffers each have an input node and an output node wherein the delay buffers are coupled in series and wherein the input node of the first delay buffer is coupled to the second clock node;
   a plurality of delay clock nodes each coupled to an output node of one of the delay buffers;
   a plurality of synchronizers each having a first input node, a second input node and an output node wherein the first input node is coupled to one of the delay clock nodes, and the second input node is coupled to the first clock node;
   a plurality of first NAND gates each having a first input node, a second input node and an output node wherein the first input node is coupled to an inverse node of the output node of one of the synchronizers, the second input node is coupled to the output node of the next synchronizer;
   a plurality of second NAND gates each having a first input node, a second input node and an output node wherein the first input node is coupled to an inverse node of output node of one of the synchronizer, the second input node is coupled to the output node of a previous synchronizer;
   a plurality of rising-edge registers each is coupled to output nodes of a group of neighboring first NAND gates and each rising-edge register is coupled in series; and
   a plurality of falling-edge registers each is coupled to output nodes of a group of neighboring second NAND gates and each falling-edge register is coupled in series.

2. The receive timing manager of claim 1 wherein the delay buffers have a total delay greater than a clock period of a clock at the first clock node.

3. An edge detection logic circuit comprising:
   a first clock node;
   a second clock node;

a plurality of delay buffers each have an input node and an output node wherein the delay buffers are coupled in series and wherein the input node of the first delay buffer is coupled to the second clock node;

a plurality of delay clock nodes each coupled to an output node of one of the delay buffers;

a plurality of synchronizers each having a first input node, a second input node and an output node wherein the first input node is coupled to one of the delay clock nodes, and the second input node is coupled to the first clock node;

a plurality of first NAND gates each having a first input node, a second input node and an output node wherein the first input node is coupled to an inverse node of an output node of one of the synchronizers, the second input node is coupled to the output node of the next synchronizer;

a plurality of second NAND gates each having a first input node, a second input node and an output node wherein the first input node is coupled to an inverse node of an output node of one of the synchronizers, the second input node is coupled to the output node of a previous synchronizer;

a plurality of rising-edge registers each is coupled to output nodes of a group of neighboring first NAND gates and each rising-edge register is coupled in series; and a plurality of falling-edge registers each is coupled to output nodes of a group of neighboring second NAND gates and each falling-edge register is coupled in series.

4. The circuit of claim 3 wherein the delay buffers have a total delay greater than a clock period of a clock at the first clock node.

5. A circuit for selecting an optimal sample point of a received data, comprising:
   means for receiving data and a clock signal from an external source;
   means for using a digital logic circuit to select a sample window utilizing a non-locked loop clock signal derived from the received clock;
   sampling means for taking a plurality of samples in the sample window;
   means for finding a transition point; and
   means for selecting an optimal sample point away from the transition point, wherein the sample window is greater than a period of the received clock.

6. The method of claim 5 wherein the sample window is greater than a clock and half period.

7. A method of selecting an optimal sample point of a received data, the method comprising:
   receiving data and a clock signal from an external source;
   using a digital logic circuit to select a sample window utilizing the received clock;
   taking a plurality of samples in the sample window;
   finding a transition point; and
   selecting an optimal sample point away from the transition point, wherein the sample window is greater than a period of the received clock, wherein
   finding the transition point comprises finding rising edges and falling edges;
   selecting the optimal sample point comprises finding rising to falling half values between the rising edge and falling edge by dividing the interval between the rising edge and the falling edges by 2;
   finding falling to rising half values between the falling edge and the rising edge by dividing the interval between the falling edge and the rising edge by 2; and
   selecting the optimal sample point by adding the transition point and one of the rising to falling half values or by adding the transition point and one of the falling to rising half values.

8. A method of finding clock rising and falling edges, the method comprising:
   creating a plurality of delayed clocks from a system clock;
   sampling a plurality of samples from the system clock wherein each sample is taken at one of the delayed clocks;
   comparing each sample with a sample taken at the next delayed clock to find the rising edge;
   storing a group of rising-edge information into one of plurality of rising-edge registers wherein the rising-edge registers are coupled in series;
   comparing each sample with a sample taken at the next delay to find the falling edge; and
   storing a group of falling-edge information into one of plurality of falling-edge registers wherein the falling-edge registers are coupled in series.

9. The method of claim 8 wherein the plurality of delayed clocks have a total span of greater than the period of the system clock.

10. The method of claim 9 wherein the plurality of delayed clocks have a total span of greater than one and half the period of the system clock.

11. The method of claim 8 wherein the group of rising-edge information is taken from a group of samples having a span smaller than a clock period of the system clock and the group of falling-edge information is taken from a group of samples having a span smaller than a clock period of the system clock.

12. The method of claim 8 wherein the group of rising-edge information is re-sampled at the next system clock cycle and combined with a next rising-edge register, the group of falling-edge information is re-sampled at the next system clock cycle and combined with a next falling-edge register.

13. A receive timing manager comprising:
   means for edge detection coupled to an incoming data node and an incoming clock and having an output related to a detected edge of a signal at the data node utilizing a non-locked loop clock signal derived from the incoming clock; and
   a selection circuit configured to store a plurality of time shifted samples of the signal at the data node, the selection circuit outputting a first sample that is one of the time shifted samples based upon a value of the output of the edge detection means wherein the edge detection means detects both rising edges and falling edges.

14. The receive time manager of claim 13 wherein data is received from a data source.

15. The receive time manager of claim 14 wherein the data source is a memory.

16. The receive time manager of claim 15 wherein the memory is a DDR memory.

* * * * *